(No Model.)

J. C. CRAIG.
COMBINED LATCH AND LOCK.

No. 387,400. Patented Aug. 7, 1888.

Witnesses:
John Grist.
H. Pennock.

Inventor:
J. C. Craig.
By Henry Grist.
Attorney.

UNITED STATES PATENT OFFICE.

JOHN C. CRAIG, OF FENELON FALLS, ONTARIO, CANADA.

COMBINED LATCH AND LOCK.

SPECIFICATION forming part of Letters Patent No. 387,400, dated August 7, 1888.

Application filed December 27, 1887. Serial No. 259,137. (No model.)

*To all whom it may concern:*

Be it known that I, JOHN CHARLES CRAIG, of Fenelon Falls, in the Province of Ontario, in the Dominion of Canada, have invented certain new and useful Improvements in Combined Latches and Locks; and I do hereby declare that the following is a full, clear, and exact description of the same, reference being had to the accompanying drawings, in which—

Figure 1:
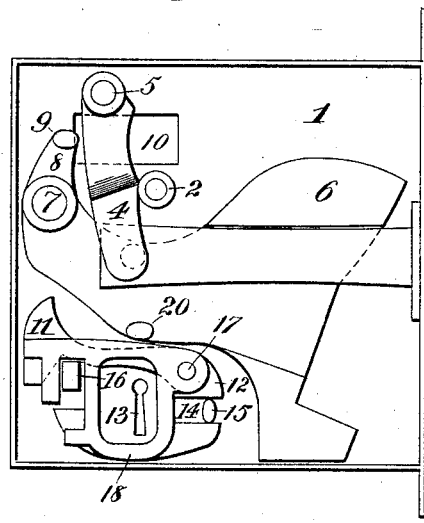
Figure 3:
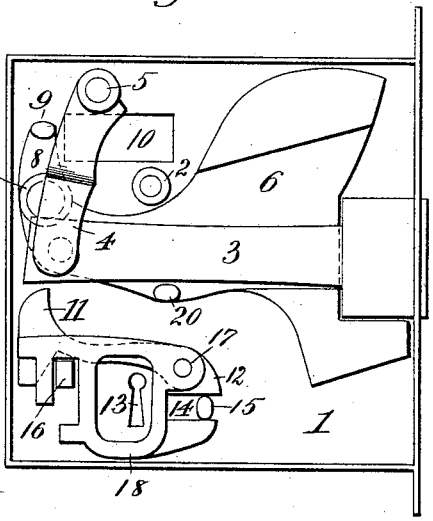
Figure 2:
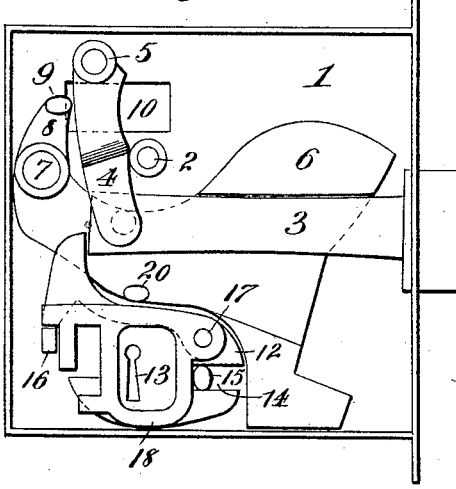
Figure 4:
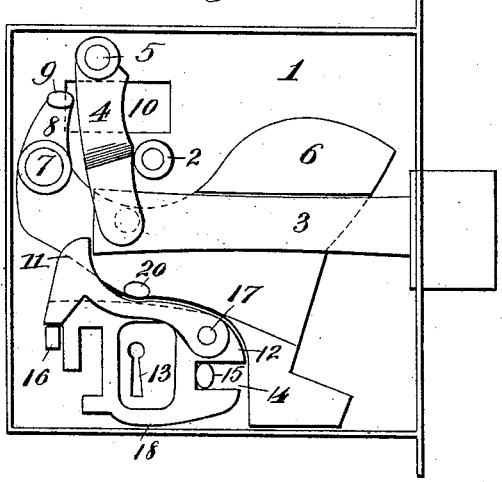

Figure 1 is a plan of the interior of my improved latch and lock, showing the latch-bolt unlocked. Fig. 2 is a like view showing the latch-bolt locked. Fig. 3 is a like view showing the latch-bolt retracted, and Fig. 4 is a like view showing the latch-bolt locked, the tumblers being removed to plainly show the dog for locking the latch-bolt.

My invention has for its object to construct a springless latch and lock having but one bolt, which is locked by a dog and slide operated by a key.

My invention consists in certain combination of parts composing the interior parts of the latch and lock, as will be hereinafter described and claimed.

I is the lock-case, having a hollow post, 2, to secure the cover by a screw in the ordinary manner.

3 is the latch and lock bolt; the inner end pivoted to a pendulum, 4, which is hung on a stud, 5, fixed to the case.

6 is a gravitating weight pivoted at 7 to the lock-case, and has an arm, 8, provided with a stud, 9, to engage the edge of the pendulum, so that by the gravitation of the weight the pendulum will be swung in one direction to project the bolt from the lock-case, and when swung in the opposite direction by means of a knob-spindle, slide, or other well-known device attached to the door and inserted through opening 10 in the lock-case the bolt will be retracted, as shown in Fig 3, to allow the door to be opened.

11 is a dog pivoted to a slide, 12, which is reciprocated by a key entered at the key-hole 13 in the lock-case, and said slide is provided with a horizontal slot, 14, at one end, which receives a stud, 15, fixed to the lock-case, whereby the slide will be moved pivotally and slidingly on the stud by a key. The opposite end of the slide is notched to bear on a post, 16, fixed to the lock-case, and is slotted horizontally and vertically to engage said post, whereby the slide cannot be moved until pivotally lifted over the post by the key. The slide has a post, 17, on which the dog is pivoted at one end. The other end of the dog is T-shaped to close the opening between the end of bolt 3 and post 16 when slide 12 is moved forward by a key to the position shown in Figs. 2 and 4, so that retraction of the bolt by the pendulum is prevented by the resistance of the dog and slide against the post, and unlocking can be effected only by the application of a key to move the slide, whereby the dog will be receded from the end of the bolt.

18 are tumblers placed pivotally at one end on post 17 and the opposite end slotted similar to the corresponding end of slide 12 to bear on post 16, and the depression of the tumblers is accelerated by the gravitating weight 6, having a projection, 20, bearing on the top of the tumblers. The tumblers prevent the use of an unauthorized key to shift the slide and move the dog into and out of contact with the bolt and post 16.

I claim as my invention—

1. The combination of the gravitating weight 6, pivoted to the lock-case and having an arm, 8, pendulum 4, pivoted to the lock-case, and bolt 3, pivoted to the pendulum, whereby the arm of the weight causes the pendulum to project the bolt after the latter has been retracted, substantially as set forth.

2. In a combined latch and lock, the combination, with the case 1, having stud 15, and post 16, of the slide 12, dog 11, bolt 3, pendulum 4, and gravitating weight 6, having an arm, 8, to engage the pendulum, as set forth.

J. C. CRAIG.

Witnesses:
 DONALD MCFADDEN,
 E. FITZGERALD.